United States Patent [19]

Lasoen

[11] Patent Number: 5,085,095
[45] Date of Patent: Feb. 4, 1992

[54] GEARBOX SELECTOR MECHANISM

[75] Inventor: Jean J. Lasoen, Ville Preux, France

[73] Assignee: Massey-Ferguson Services N.V., Netherlands Antilles, Netherlands Antilles

[21] Appl. No.: 549,004

[22] PCT Filed: Dec. 18, 1989

[86] PCT No.: PCT/EP89/01565
§ 371 Date: Oct. 17, 1990
§ 102(e) Date: Oct. 17, 1990

[87] PCT Pub. No.: WO90/07662
PCT Pub. Date: Jul. 12, 1990

[30] Foreign Application Priority Data

Dec. 24, 1988 [GB] United Kingdom ............... 8830267

[51] Int. Cl.$^5$ ................................. F16H 63/44
[52] U.S. Cl. ........................... 74/473 R; 74/335
[58] Field of Search .................. 74/473 R, 335

[56] References Cited

U.S. PATENT DOCUMENTS 4,615,233 10/1986 Lasoen .......................... 74/473 R
4,920,815 5/1990 Reynolds ....................... 74/473 R

FOREIGN PATENT DOCUMENTS 122014 10/1984 European Pat. Off.
2089271 1/1972 France.
2136516 9/1984 United Kingdom.

Primary Examiner—Dirk Wright
Attorney, Agent, or Firm—MacMillan, Sobanski & Todd

[57] ABSTRACT

A selector mechanism for a gearbox in which speed change couplers (28, 29) and a range change coupler (34) are operated by the same selector lever (47). Lever (47) operates the speed change couplers to engage a plurality of drive speeds when moved from a neutral plane to speed selection positions (1, 2, 3, 4) in a speed change gate and operates the range change couplers when moved to discrete range change positions (H,L). The selector mechanism is arranged so that on movement of the selector lever (47) out of the speed change gate towards a desired range change position (H, L) the range change coupler (34) is moved towards an engaged position for the desired range and on movement of the selector lever back towards the speed change gate from the desired range change position the movement of the range change coupler (34) is completed to engage the desired range.

5 Claims, 6 Drawing Sheets

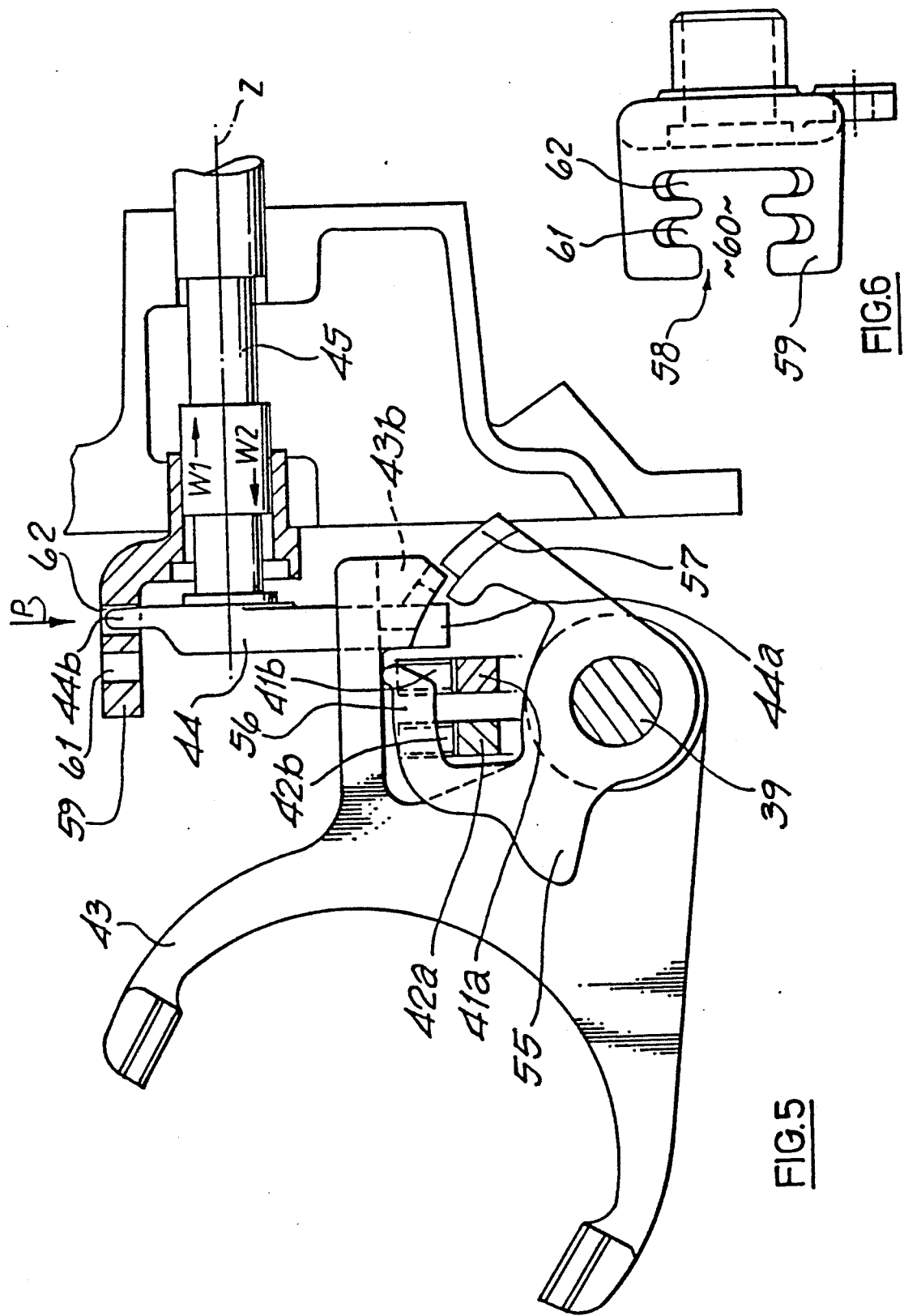

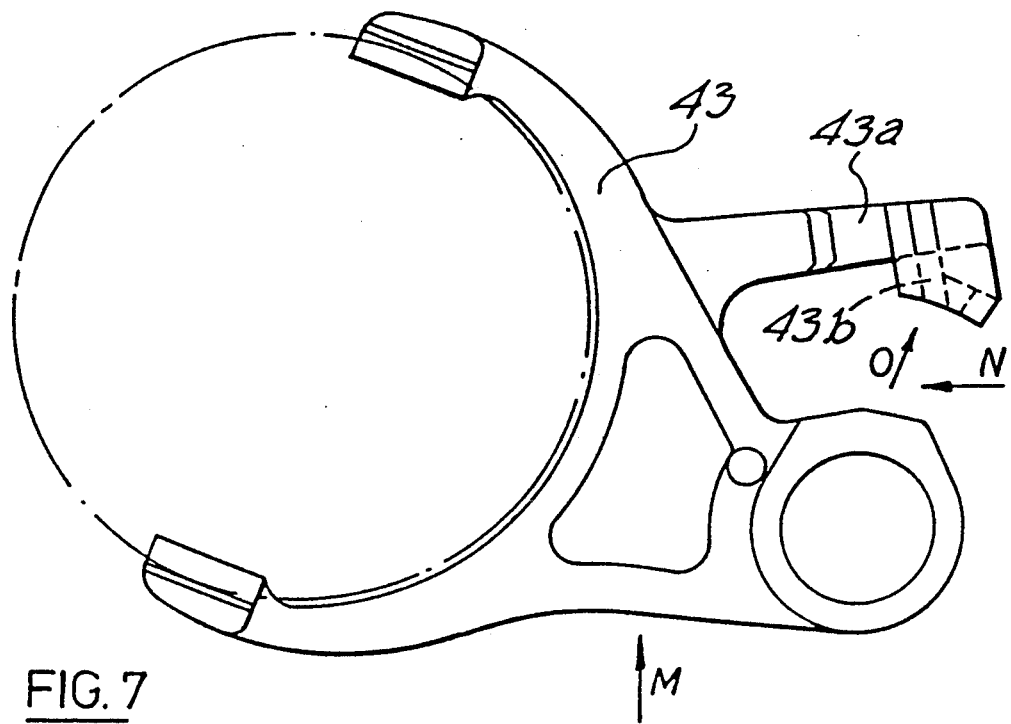
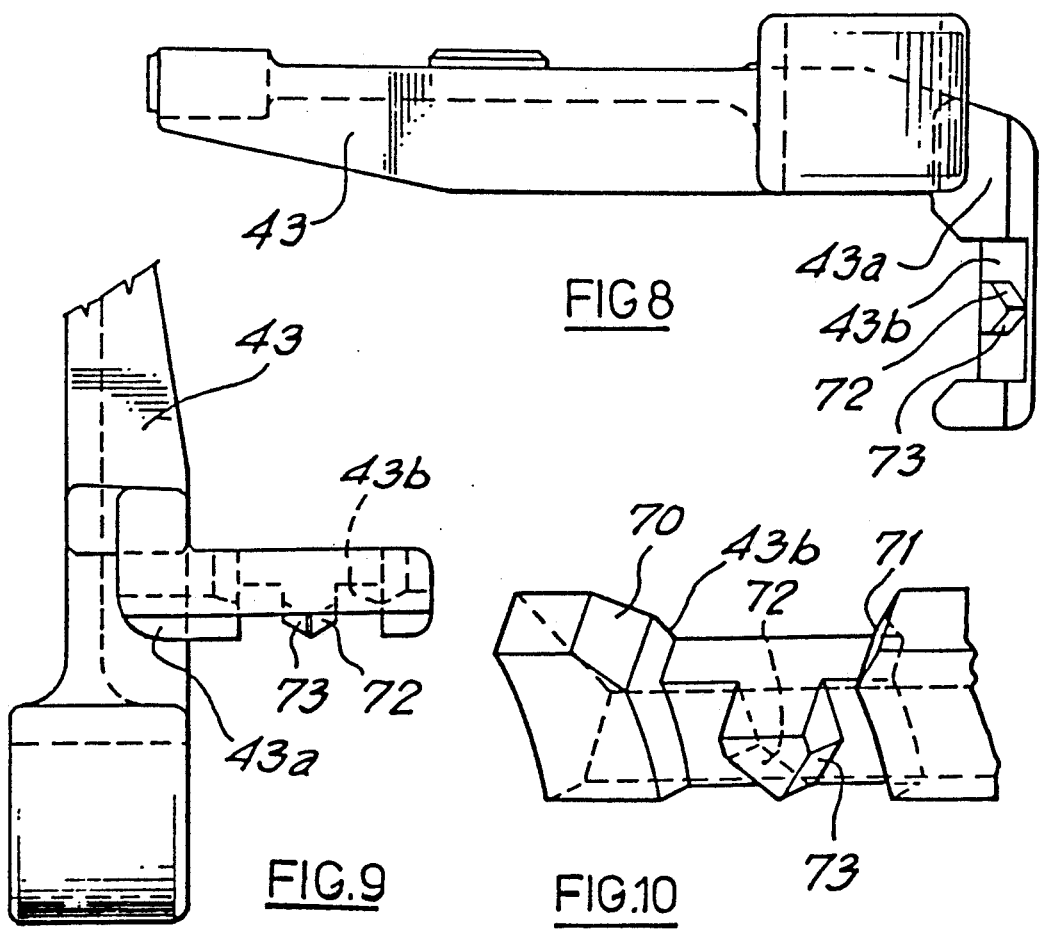

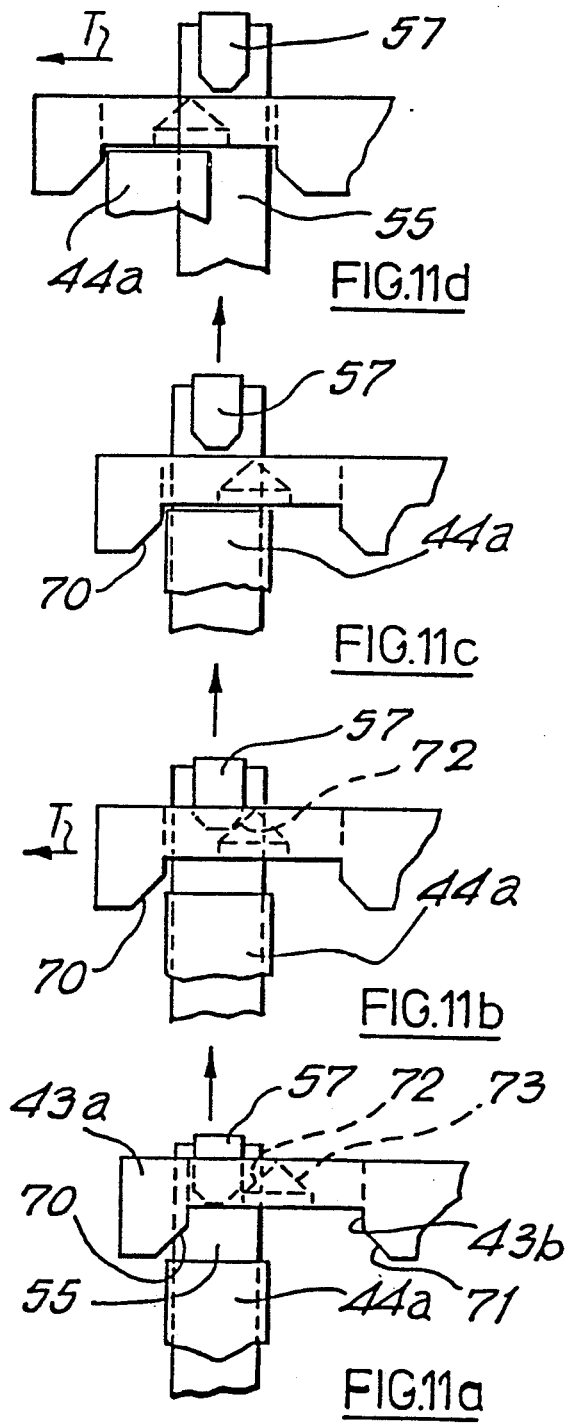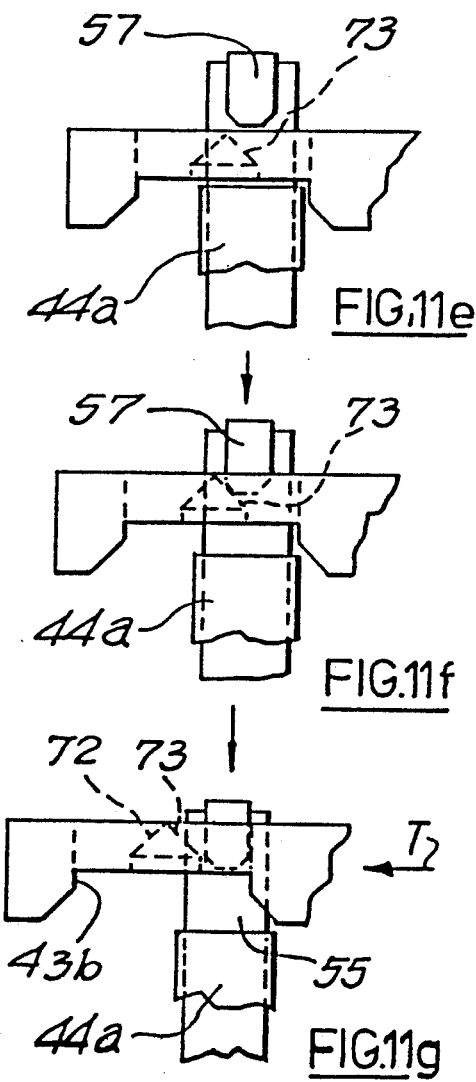

GEARBOX SELECTOR MECHANISM

This invention relates to gearbox selector mechanisms and in particular such mechanisms which require the sequential operation of separate couplers within the gearbox by a single selector member. An example of such a mechanism is in a tractor gearbox where speed change couplers and range change couplers are required to be operated by a single selector member in the form of a gear lever.

Various selector mechanisms have been proposed for such applications. For example, the mechanism disclosed in United Kingdom patent number 1546461. However such mechanisms have produced relative complex gear lever shift patterns as shown by the double H-shift pattern of the above patent.

It is an object of the present invention to provide a selector mechanism suitable for a gearbox in which a single selector member controls both speed and range changes and in which a simple selector member shift pattern is achieved.

Thus according to the present invention there is provided a selector mechanism for a gearbox in which one or more speed change couplers and one or more range change couplers are operated by the same selector member, said selector member operating the speed change coupler or couplers to engage a plurality of drive speeds when moved from a neutral plane to speed selection positions in a speed change gate and operating the range change coupler or couplers when moved to discrete range change positions, the mechanism being arranged so that on movement of the selector member out of the speed change gate towards a desired range change position the appropriate range change coupler is moved towards an engaged position for the desired range and on movement of the selector member back towards the speed change gate from the desired range change position the movement of the said appropriate range change coupler is completed to engage the desired range.

In a preferred construction an H-shaped gate is used for the speed change gate with the neutral plane bridging the arms of the H and the range change positions are provided in a plane parallel to the two speed change arms of the H reached by an extension of the neutral plane of the H, the selector mechanism being arranged to move the appropriate range change coupler towards said engaged position on movement of the selector member along the extension of the neutral plane during movement of the selector member towards the range change plane, during movement of the selector member towards the appropriate range change position in the range change plane, and on movement of the selector member back along the extension of the neutral plane on its way back to the speed change gate.

The movement of the appropriate range change coupler as the selector member moves along the neutral plane extension towards the range change plane may be achieved by contact between a first component moved by the selector member and a first cam formation associated with the appropriate coupler and the movement of the coupler during the return movement of the selector member back along the extension of the neutral plane may be achieved by contact between a second component moved by the selector member and a second cam formation associated with the appropriate coupler.

The first component may be a selector finger which is moved by the selector member to engage selector formations associated with the speed and range change couplers and the second component may comprise an interlock member moved by the selector finger to allow movement of only one coupler at a time.

In a preferred construction the speed and range change couplers are operated by selector forks mounted for sliding movement on a single rail and the interlock member is mounted for pivoting about said single rail.

One embodiment of the present invention will now be described, by way of example only, with reference to the accompanying drawings in which:

FIGS. 3b and 3c show diagrammatically various selection positions of the lever arrangement of FIG. 3a;

FIG. 4 shows diagrammatically the selection gate of the lever arrangement of FIG. 3a;

FIG. 5 is a view in the direction of the arrow Q of FIG. 2.

FIG. 6 is a view in the direction of arrow P of FIG. 5;

FIG. 7 is a view in the same direction as FIG. 5 of a selector fork used as part of the selector mechanism;

FIG. 8 is a view in the direction of the arrow M of FIG. 7.

FIG. 9 is a view in the direction of the arrow N of FIG. 7;

FIG. 10 is a perspective view of part of FIG. 7 in the direction of arrow O, and FIGS. 11a to 11g diagrammatically illustrate the sequence of movements of the selector fork of FIG. 7 during a range of change selection.

Figure 1:
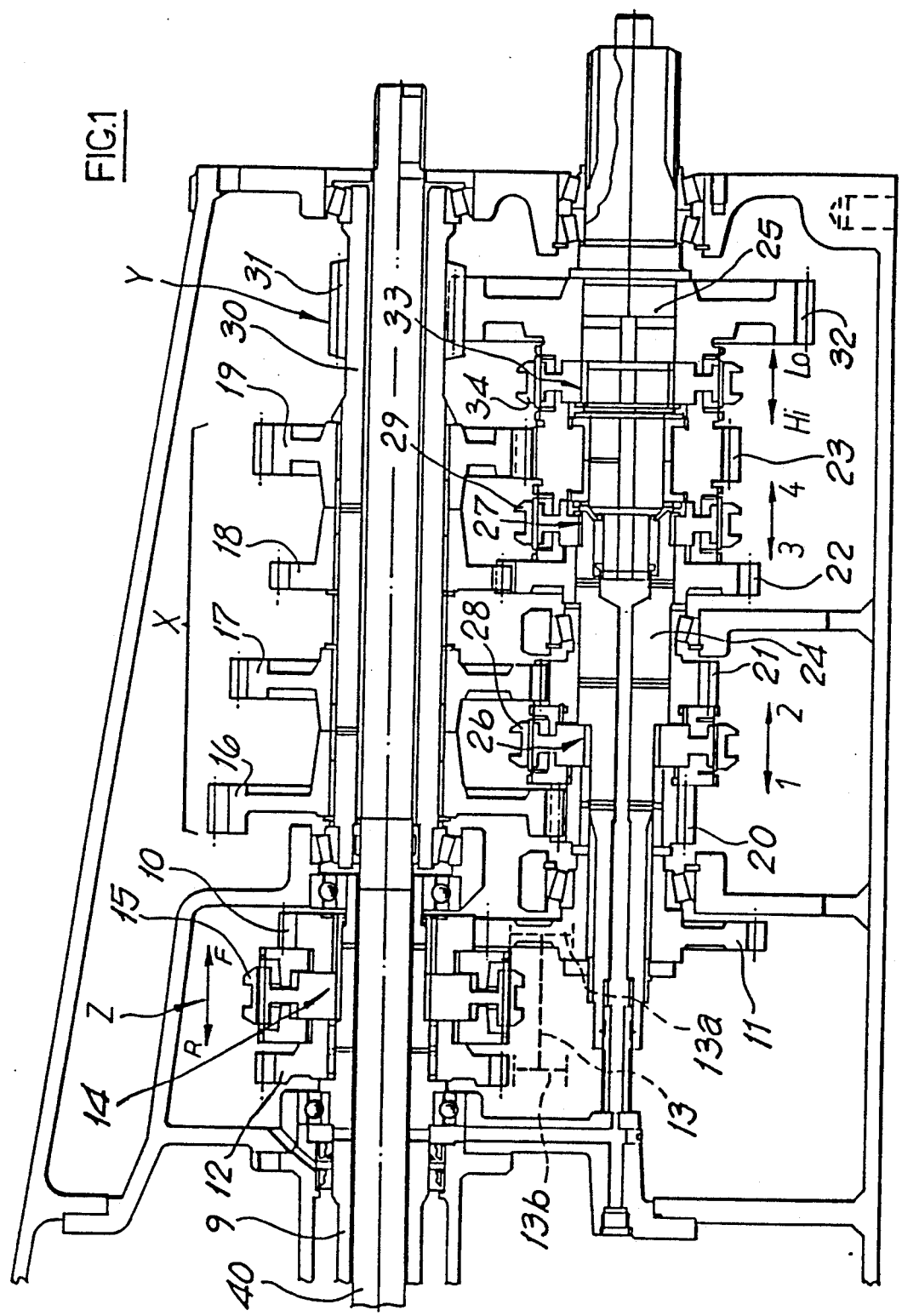
FIG. 1 is a vertical section through a tractor transmission which is controlled by a selector mechanism in accordance with the present invention.

The transmission shown in FIG. 1 comprises a main 4-speed change speed gear set X, a 2-speed high/low range change gear set Y, and an input forward/reverse gear set Z.

The input gear set Z comprises a forward gear train in the form of constant mesh gears 10 and 11 and a reverse gear train in the form of gear 12 and a reverse idler shaft shown schematically at 13 whose gears 13a and 13b are in constant mesh with gears 11 and 12 respectively. A synchromesh unit 14 with a coupling sleeve 15 is operational to provide forward drive to the transmission when the sleeve 15 is moved to the right (as viewed in FIG. 1) to connect the gear 10 with a transmission input shaft 9 which surrounds a power take-off (PTO) shaft 40.

In a similar fashion reverse drive is provided through the transmission by moving the sleeve 15 to the left to couple the gear 12 with input shaft 9 and to reverse the direction of rotation of gear 11 via the idler shaft 13.

Selection of forward and reverse drive is via a selector mechanism which operates on sleeve 15 and which is not shown since it forms no part of the present invention.

The main 4-speed change speed gear set X comprises 4 gears 16, 17, 18 and 19 splined on a lay shaft 30 which surrounds the PTO shaft 40, these gears are in constant mesh with gears 20, 21, 22 and 23 which are rotable mounted on two portions 24 and 25 of a transmission output shaft. Synchromesh units 26 and 27 having coupling sleeves 28 and 29 respectively are provided for coupling gears 20, 21 and 22, 23 to the output shaft.

The high/low range change set Y comprises a gear 31 on lay shaft 30 and a gear 32 rotable mounted on output shaft portion 25. A further synchromesh unit 33 with a coupling sleeve 34 is provided for coupling either gear 23 or 32 to the output shaft 25. When coupling sleeve 34 is moved to the left, drive is transmitted to output shaft 25 via gear 23 and the high range is engaged. With the coupling sleeve 34 moved to the right, drive is transmitted to the output shaft 25 via gear 32 from lay shaft gear 31 and a low range is engaged.

With coupler 28 of gear set X moved to the left as shown in FIG. 1, a first speed is obtained via gears 20 and 16 lay shaft 30 and then from lay shaft 30 to output shaft 25 via either gears 19, 23 or 31, 32 depending on the position of the range coupler 34.

Similarly, second and third speeds are obtained from gear set X when gears 21 and 22 are respectively coupled to shaft 24. These gears transfer drive to layshaft 30 via gears 17 and 18 respectively and drive is again transmitted to output shaft 25 via either gears 19, 23 or 31, 32.

A fourth speed is obtained when sleeve 29 is moved to the right to couple gear 23 to shaft portion 24. Drive is then transmitted to shaft portion 25 either directly from gear in the high range by moving coupler 34 to the left or via gears 23, 19, 31, 32 in the low range by moving coupler 34 to the right.

The present invention, as will be described below, is concerned with the provision of a selector mechanism which enables a single selector member to operate the two speed change couplers 28, 29 and also the range change coupler 34.

Figure 2:
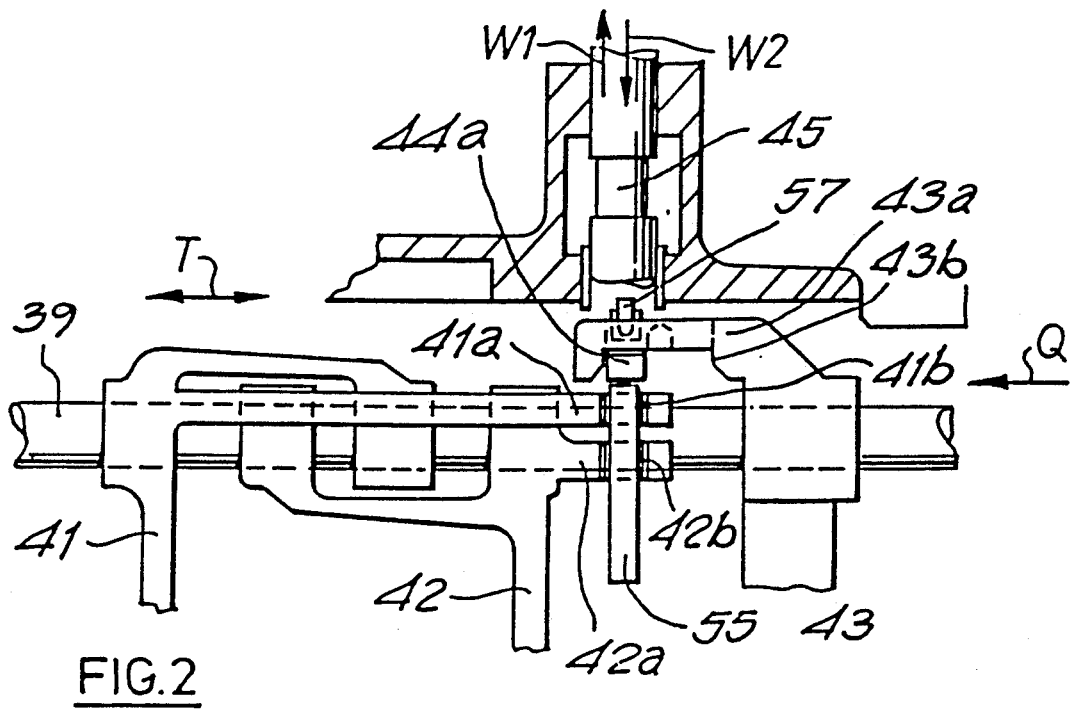
FIG. 2 is a plan view of part of the selector mechanism of the present invention.

Referring to FIG. 2, this shows schematically the selector fork arrangement in accordance with the present invention which is used to operate couplers 28, 29 and 34. Selector forks 41, 42 and 43 operate couplers 28, 29 and 34 respectively and are mounted for sliding on a single fixed support rail 39. Each selector fork has a portion 41a, 42a, 43a provided with a slot 41b, 42b, 43b which receives a selector finger 44 (see FIGS. 3a, 3b, 3c) carried on the end of a rotable and axially movable selector shaft 45 which is controlled via a gear selector lever arrangement 46 in accordance with United Kingdom Patent No. 2136516.

Gear selector lever arrangement 46 has an upper lever 47 which is pivotally mouned at 48 for pivotting about on a ball mount and a lower lever 49 which is pivotally mounted on a ball mount 50 which lies on the longitudinal axis Z of selector shaft 45. The upper and lower levers are interconnected by a cup 51 on upper lever 47 which is engaged by a part spherical member 52 on lower lever 49. Selector shaft 45 is provided with a forked arm 53 which extends either side of the lower lever 49 and is pinned at 54 to the lower lever.

Figure 4:
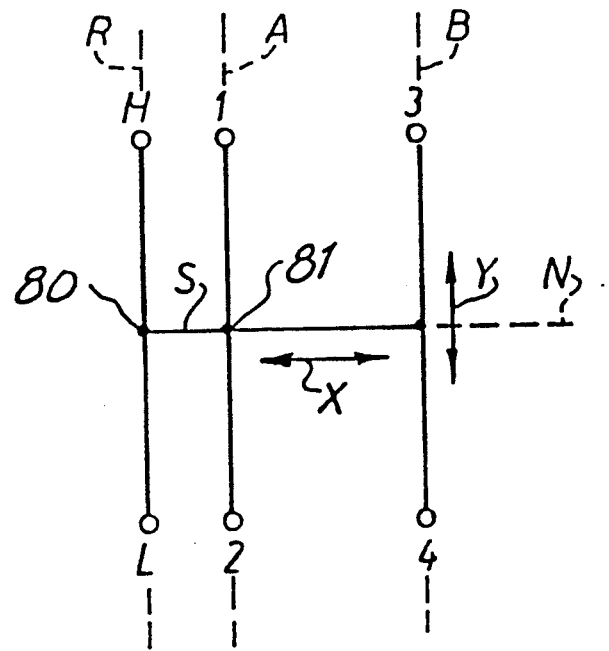

Upper lever 47 is movable in the selection gate shown in FIG. 4 in which speeds 1 to 4 are selected by movement of the lever in selection planes A and B in a conventional H-shaped gate with a neutral plane N and the high and low ranges are selected by movement of the upper lever to positions H and L in a range change plane R to one side of the speed selection gate.

Figure 3B:
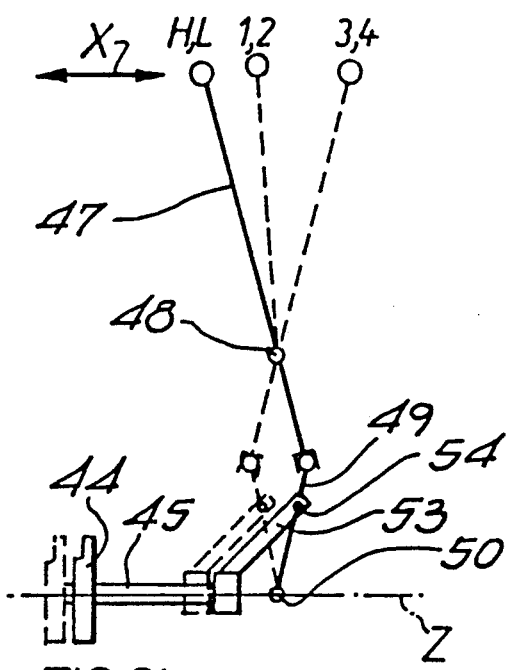
Figure 3C:
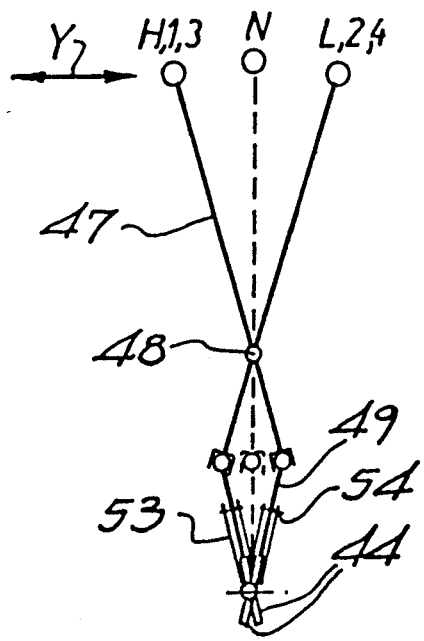
Figure 3A:
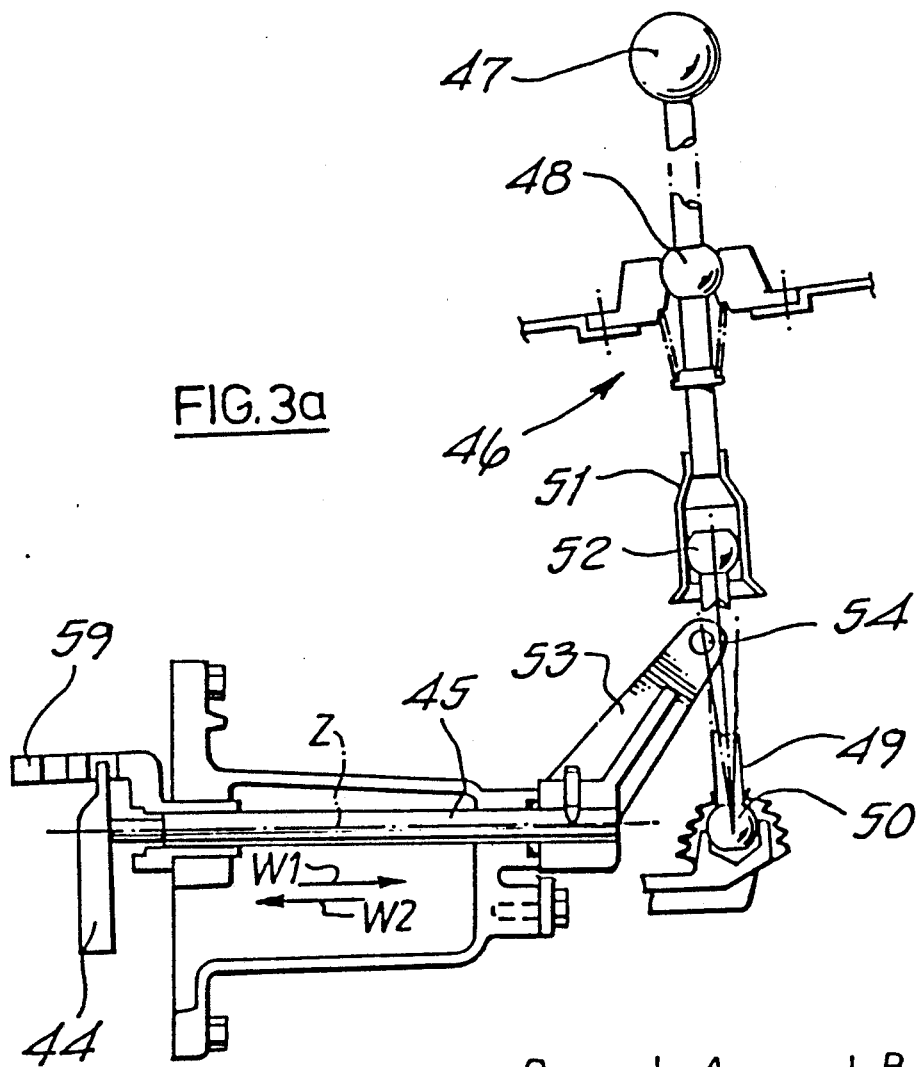
FIG. 3a shows one form of gear selector lever arrangement suitable for use as part of the present invention.

As will be appreciated movement of lever 47 in direction X of FIGS. 4 and 3b whilst in the neutral plane N moves selector finger 44 in directions W1 and W2 to pick-up slots 41b, 42b or 43b as will be described in more detail below. With the lever 47 in plane A, the finger 44 engages in slot 41b and lever 47 can be moved in direction Y of FIGS. 4 and 3c to turn shaft 45 and hence move the end of finger 44 to displace selector fork 41 in direction T of FIG. 2 to engage either speed 1 or 2 depending on which position the lever 47 is moved to in the gate. Similarly, with the lever 47 in plane B the finger 44 engages in slot 42b and the lever 47 can be moved in direction Y to turn shaft 45 to displace fork 42 in direction T and hence engage either speed 3 or 4 depending on whether the lever 47 is moved to position 3 or 4 in the gate.

As can be seen from FIGS. 2 and 5 an interlock member 55, which prevents movement of more than one of the selector forks 41, 42 or 43 at once, is also pivotally mounted on rail 39. The interlock member has a portion 56 which, when the lever 47 is moving in its neutral plane N to displace finger 44 in direction W1 or W2, is engageable in slots 41b, 42b and a portion 57 which is engageable in slots 42b, 43b. As will be appreciated and as is described in greater detail below, the interlock member 55 is pivotted about rail 39 by contact with the lower end 44a of finger 44.

Finger 44 is also provided with an upper projection 44b which engages a control gate 58 provided in gate member 59 (see FIG. 6). Gate 58 has a central slot 60 along which the projection 44b moves when lever 47 is in its neutral plane N and two perpendicular slots 61 and 62 which correspond to movement of the lever 47 in planes A and R respectively. As will be appreciated slots 61 and 62 ensure the correct positioning of the lower end 44a of finger 44 in slots 41b and 43b respectively during selection of speeds 1 or 2 and ranges H or L respectively.

The present invention is concerned with the manner in which lever 47 is also able not only to select speeds 1 to 4 but also the high and low ranges H and L. Basically this is achieved by arranging that as the lever 47 moves towards plane R from plane A, that is along portion S of the lever gate, the lower end 44a of selector finger 44 makes contact with either cam surface 70 or 71 built into the sides of slot 43b to begin axial displacement of the selector fork 43 in direction T along rail 39. Further axial displacement of fork 43 occurs as the lever is moved within plane R towards either the H or L positions and the final movement of fork 43 necessary to engage either the H or L range is made as the lever 47 is moved back along portion S of the gate on its way to re-enter the speed selection part of the gate to select the operative speed. In the embodiment to be described in detail, this final axial movement is obtained by the contact of portion 57 of the interlock member 55 with either cam surface 72 or 73 of the slot 43b as the interlock member 55 is moved back through slot 43b by abutment of the lower end 44a of the FIG. 44 with the end of protion 56 of the interlock member as the finger moves to engage either slot 41b or 42b to select the operative speed in gear set X.

FIGS. 7, 8, 9 and 10 show details of the slot 43b in selector fork 43 and FIGS. 11a to 11g show the sequence of movements of selector fork 43 involved in the selection of the high range H.

FIG. 11a shows the selector finger portion 44a making initial contact with the cam surface 70 as the lever moves along portion S of the gate. As the lever continues along portion S of the gate the finger 44a moves to the FIG. 11b position and in so doing crosses the cam surface 70 and displaces the selector fork 43 to the left (in direction T) as a result of the cam action between surface 70 and finger 44a.

Typically this results in a 5mm axial movement of selector fork 43 to the left. When the lever 47 has completed its movement to plane R and reached position 80 of FIG. 4, the finger 44a is in the FIG. 11c position with the interlock portion 57 clear of slot 57 (as also shown in FIG. 5).

The lever 47 is now moved from position 80 to the high range selector position H and the selector fork 43 is thus moved to the left of the FIG. 11d position by finger 44a to provide typically say another 10mm of axial movement of the selector fork in direction T. It is during this movement that synchronisation takes place.

The vehicle operator now begins the return movement of the selector lever 47 back towards the speed selection potion of the gate by moving lever 47 from position H to position 80. This results in the finger 44a moving from one end of slot 43b (FIG. 11d) the other (FIG. 11e) without any axial movement of the selector fork 43 occurring.

As the lever 47 moves from position 80 back along portion S of the gate the finger 44a contacts portion 56 of the interlock member 55 and pivots the interlock member anti-clockwise as viewed in FIG. 5 to cause portion 57 to re-enter slot 43b and make contact with cam surface 73 (FIG. 11f) to again axially displace selector fork to the left in direction T typically a further 5mm of axial movement is obtained as the FIG. 44a moves from the FIG. 11f to the FIG. 11g position thus completing the selection of the high range.

When lever 47 reaches position 81 in plane A, the finger 44a has cleared slot 43b (FIG. 11g) and interlock portion 57 is engaged in slot 43b to prevent displacement of the range selector fork 43.

Thus the above arrangement enables a typical total axial movement of 20mm of selector fork 43 to be obtained by moving the selector fork 5mm between positions 81 and 80, 10mm between positions 80 and H and the final 5mm on the return between positions 80 and 81.

It will be appreciated that the low range is selected in a similar manner with the finger 44a and selector fork 43 moving in the sequence of events shown by FIGS. 11g to 11a and the utilisation of cam surfaces 71 and 72.

A further benefit of the simple single lever selection arrangement of the present invention is that before any change can be made in the operative high or low range, the lever 47 must be placed in the neurtral plane N thus ensuring that drive through the speed change gear set X is disconnected during range changes.

I claim:

1. A selector mechanism for a gearbox in which one or more speed change couplers (28, 29) and one or more range change couplers (34) are operated by the same selector member (47), said selector member operating the speed change coupler or couplers (28, 29), to engage a plurality of drive speeds when moved from a neutral plane (N) to speed selection positions (1, 2, 3, 4) in a speed change gate and operating the range change couper or couplers (34) when moved to discrete range change positions (H, L), the mechanism being characterised in that on movement of the selector member (47) out of the speed change gate (1, 2, 3, 4) towards a desired range change position (H, L) the appropriate range change coupler (34) is moved towards an engaged position for the desired range and on movement of the selector member back towards the speed change gate (1, 2, 3, 4) from the desired range change position the movement of the said appropriate range change coupler (34) is completed to engage the desired range.

2. A selector mechanism according to claim 1 characterised in that an H-shaped gate is used for the speed change gate (1, 2, 3, 4) with the neutral plane (N) bridging the arms of the H and the range change positions are provided in a plane (R) parallel to the two speed change arms (A, B) of the H reached by an extension (S) of the neutral plane of the H, the selector mechanism being arranged to move the appropriate range change coupler (34) towards said engaged position on movement of the selector member (47) along the extension (S) of the neutral plane (N) during movement of the selector member (47) towards the range change plane (R), during movement of the selector member (47) towards the appropriate range change position (H, L) in the range change plane (R), and on movement of the selector member (47) back along the extension (S) of the neutral plane (N) on its way back to the speed change gate (1, 2, 3, 4).

3. A selector mechanism according to claim 1 or claim 2 characterised in that the movement of the appropriate range change coupler (34) as the selector member (47) moves along the neutral plane extension (S) towards the range change plane (R) is achieved by contact between a first component (44) moved by the selector member (47) and a first cam formation (70, 71) associated with the appropriate coupler (34) and the movement of the coupler during the return movement of the selector member (47) back along the extension (S) of the neutral plane (N) is achieved by contact between a second component (57) moved by the selector member and a second cam formation (72, 73) associated with the appropriate coupler (34).

4. A selector mechanism according to claim 3 characterised in that the first component is a selector finger (44) which is moved by the selector member (47) to engage selector formations (41b, 42b, 43b) associated with the speed and range change couplers (28, 29, 34) and the second component is an interlock member (57) moved by the selector finger (44) to allow movement of only one coupler at a time.

5. A selector mechanism according to claim 4 characterised in that the speed and range change couplers (28, 29, 34) are operated by selector forks (41, 42, 43) mounted for sliding movement on a single rail (39) and the interlock member (57) is mounted for pivotting about said single rail.

* * * * *